United States Patent [19]

Ivan

[11] Patent Number: 5,765,115
[45] Date of Patent: Jun. 9, 1998

[54] PNEUMATIC TILT STABILIZATION SUSPENSION SYSTEM

[75] Inventor: Jerome C. Ivan, Troy, Mich.

[73] Assignee: Ford Motor Company, Dearborn, Mich.

[21] Appl. No.: 511,578

[22] Filed: Aug. 4, 1995

[51] Int. Cl.$^6$ .................................................. B60G 11/26
[52] U.S. Cl. .................... 701/38; 280/689; 280/707
[58] Field of Search ................ 364/424.046, 424.047; 280/707, 689, 711, 714; 701/37, 38

[56] References Cited

U.S. PATENT DOCUMENTS

| | | | |
|---|---|---|---|
| 4,517,832 | 5/1985 | Holland et al. | 73/118 |
| 4,564,214 | 1/1986 | Tokunaga et al. | 280/707 |
| 4,575,116 | 3/1986 | Miyata | 280/707 |
| 4,591,186 | 5/1986 | Ashiba | 280/707 |
| 4,613,154 | 9/1986 | Tanaka et al. | 280/707 |
| 4,616,163 | 10/1986 | Kanai et al. | 318/611 |
| 4,621,832 | 11/1986 | Nakashima et al. | 280/707 |
| 4,650,212 | 3/1987 | Yoshimura | 280/707 |
| 4,652,010 | 3/1987 | Sugasawa | 280/707 |
| 4,765,649 | 8/1988 | Ikemoto et al. | 280/707 |
| 4,803,627 | 2/1989 | Yasuike et al. | 364/424.05 |
| 4,822,063 | 4/1989 | Yopp et al. | 280/840 |
| 4,827,416 | 5/1989 | Kawagoe et al. | 364/424.05 |
| 4,830,394 | 5/1989 | Tanaka et al. | 280/689 |
| 4,846,496 | 7/1989 | Tanaka et al. | 280/689 |
| 4,853,860 | 8/1989 | Achenbach | 364/424.05 |
| 4,903,982 | 2/1990 | Harara et al. | 280/707 |
| 4,930,082 | 5/1990 | Harara et al. | 364/424.05 |
| 4,943,084 | 7/1990 | Fukunaga et al. | 280/707 |
| 5,016,907 | 5/1991 | Akatsu et al. | 280/707 |
| 5,072,392 | 12/1991 | Taniguchi | 364/424.05 |
| 5,083,275 | 1/1992 | Kawagoe et al. | 364/424.05 |
| 5,083,454 | 1/1992 | Yopp | 73/118.1 |
| 5,144,558 | 9/1992 | Fukushima et al. | 364/424.05 |
| 5,144,559 | 9/1992 | Kamimura et al. | 364/424.05 |
| 5,246,247 | 9/1993 | Runkel | 280/708 |
| 5,287,277 | 2/1994 | Mine et al. | 364/424.05 |
| 5,384,705 | 1/1995 | Inagaki et al. | 364/424.05 |
| 5,437,354 | 8/1995 | Smith | 188/299 |
| 5,529,153 | 6/1996 | Smith | 188/299 |

FOREIGN PATENT DOCUMENTS

| | | |
|---|---|---|
| 0 416 560 A1 | 3/1991 | European Pat. Off. |
| 4-274916 | 9/1992 | Japan |

*Primary Examiner*—Jacques H. Louis-Jacques
*Assistant Examiner*—Edward J. Pipala
*Attorney, Agent, or Firm*—Gregory P. Brown

[57] ABSTRACT

A controllable suspension system includes air springs and variable damping shock absorbers (108) switchable between first and second effective spring rates and soft and firm damping rates. At speeds above a given speed, lateral accelerations exceeding predetermined limit will result in switching the shock absorbers to firm and closing front and rear gate valves (126,128) between left and right air springs to increase the spring rate from a first effective spring rate to a second effective spring rate to increase vehicle tilt stabilization.

12 Claims, 3 Drawing Sheets

PNEUMATIC TILT STABILIZATION SUSPENSION SYSTEM

BACKGROUND OF THE INVENTION

This invention relates to a similar, commonly assigned copending U.S. patent application Ser. No. 08/356,992, which is entitled *Speed Dependent Suspension Control*, filed on Dec. 16, 1994, now U.S. Pat. No. 5,570,287.

1. Field of the Invention

The present invention relates in general to motor vehicle suspension systems which include variable damping shock absorbers and controllable springs, for example air springs, and, more particularly, to an arrangement of valves capable of decoupling the right side pneumatic springs from left side pneumatic springs to provide tilt stabilization.

2. Disclosure Information

Motor vehicle suspension systems are connected between the body of the vehicle and the wheels to determine the ride and handling of the vehicle. Conventional suspension systems include springs and shock absorbers which are fixed such that the ride and handling are fixed as well.

More advanced suspension systems include controllable elements such as controllable springs and variable damping shock absorbers which permit two or more damping factors to be selected as needed. Such springs are typically pneumatically or air controlled and are inflated to increase the spring rate of the overall vehicle spring system and deflated to decrease the spring rate. The springs may also be used to adjust the height of the vehicle body relative to the road.

In prior art suspension systems, the springs and shocks may be manually controlled by the operator of the vehicle. Automatic control is also utilized to control the springs and shocks in response to inputs from the vehicle as well. For example, the ride height of the vehicle may be adjusted to provide lower aerodynamic drag at high speeds.

Conventional and advanced adjustable suspension systems share a common trade off between tilt control and ride quality. Generally, a stabilizer bar is incorporated in the suspension to control the tilting of the vehicle body when subjected to lateral acceleration during cornering maneuvers. The stabilizer bar transmits undesirable forces through the suspension when a wheel of the suspension encounters a bump in the road surface. Without the stabilizer bar, the suspension would simply absorb the bump, but the stabilizer bar transmits this deflection to the opposite side of the vehicle, imparting a ride motion on the vehicle that is considered undesirable by most operators. Accordingly, there is a need for an improved suspension system capable of providing the tilt stabilization of a stabilizer bar without the force transfer effect caused by conventional stabilizer bars, thereby eliminating the compromises which are made in the prior art between ride quality and tilt stabilization.

SUMMARY OF THE INVENTION

The present invention provides a pneumatic tilt stabilization apparatus for use in a controllable suspension connected between a body and wheels of a motor vehicle. The pneumatic tilt stabilization apparatus includes a lateral acceleration sensor for sensing lateral acceleration of the motor vehicle and generating a lateral acceleration signal corresponding thereto. The tilt stabilization apparatus also includes right and left air springs and an air compressor for providing pressurized air to a main supply line. A gate solenoid valve communicates fluid from the main supply line to the left and right air springs. The gate solenoid valve has a closed position for preventing fluid transfer between the right and left air springs and an open position for permitting fluid transfer between the right and left air springs. A controller is provided for selecting the open position of the gate solenoid valve when the lateral acceleration signal is below a predetermined minimum, thereby providing a first effective spring rate and selecting the closed position of the gate solenoid valve when the lateral acceleration signal exceeds the predetermined minimum, thereby providing a second effective spring rate. The second effective spring rate is higher than the first effective spring rate and provides increased tilt stabilization.

It is an advantage of the present invention to provide an improved suspension control system which selects between two effective spring rates based on lateral acceleration to improve overall ride quality and tilt stabilization.

Other features and advantages of the present invention will become apparent to those skilled in the art from the following description, the accompanying drawings and the appended claims.

DETAILED DESCRIPTION OF THE INVENTION

Figure 1:
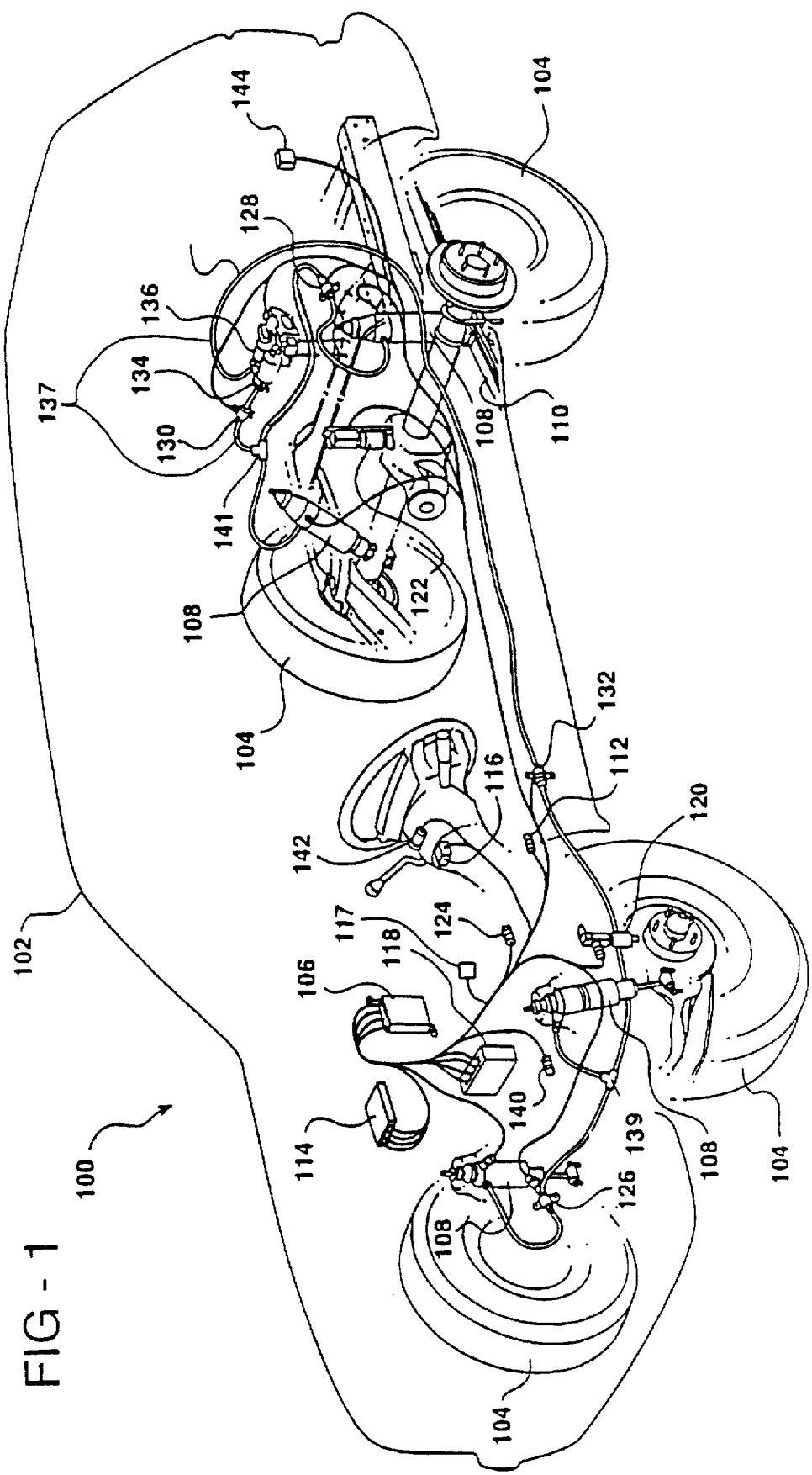
FIG. 1 is a perspective view of a vehicle, with the body shown in outline, including a controllable suspension system operable in accordance with the present invention.

The invention of the present application will be described with reference to a vehicle 100 and, more particularly, to a controllable suspension connected between a body 102 and wheels 104 of the vehicle 100 as illustrated in FIG. 1. The vehicle 100 includes an automatic ride control system having a computer controller 106 which controls the various components of the suspension. The four corners of the vehicle are controlled, in part, by two stage, firm and soft, shock absorbers 108 to provide a smooth ride for normal driving without sacrificing handling performance. An air spring integral with each shock absorber 108 permits load leveling and vehicle height adjustment over a span of approximately 50 mm (2 inches). Of course, air springs and shock absorbers which are separate from one another could be used for the suspension.

A smooth ride is partially achieved through selection of lower rate front torsion bars, not shown, rear leaf springs 110, and front and rear anti-roll bars, not shown, and selection of soft damping for the shock absorbers 108. Tilt stabilization and handling performance is maintained by providing harder damping for the shock absorbers 108 and maintaining a higher spring rate by blocking the transfer of air from air springs on one side of the vehicle to air springs on the opposite side of the vehicle. Driver inputs may include: braking, monitored via a brake switch 112; throttle position, monitored via a primary engine control computer 114; steering rate and position, monitored via a steering sensor 116; lateral acceleration, monitored via an accelerometer 117; and, since the illustrated vehicle 100 includes a selectable four wheel drive capability, transfer case setting, monitored via an electronic module 118. Road inputs are sensed by a vehicle speed indicator 124 located near an output shaft of a transmission, not shown, of the vehicle 100 and two suspension mounted height sensors, a front height sensor 120 and a rear height sensor 122.

The automatic ride control system controls the height of the vehicle 100 on the front and rear axles separately through the use of an air compressor 136, main air supply line 137, two three way or "T" junctions 139, 141, and five solenoid valves: a front gate solenoid valve 126; a rear gate solenoid valve 128; a rear fill solenoid valve 130; a front fill solenoid valve 132; and, a vent solenoid valve 134. The vent solenoid valve 134 is located in a cylinder head of the air compressor 136. The compressor 136 is controlled via a compressor relay 140. This configuration significantly reduces system complexity and costs by using five common solenoid valves, rather than unique valves for performing the gating, filling and venting function. For instance, a three position solenoid valve could be substituted for the "T" junction 139 and the front gate solenoid valve 126, however, this would have the added complexity of including another type of valve in addition to the increased cost associated with such a valve.

Enclosed in each of the shock absorbers 108 is an air spring and a mechanism that enables switching between soft and firm damping. The air spring integrated into each of the shock absorbers 108 is capable of independently raising and lowering each corner of the vehicle 100 based on the pressure and volume of air supplied to it. The automatic ride control system regulates the pressure in each air spring by compressing and venting the air provided to it. As earlier noted, the air springs and shock absorbers 108 could be separate from one another. Further, since a variety of mechanisms are known for switching the damping rate of shock absorbers for motor vehicles, the shock absorbers will not be described in detail herein.

The air compressor 136 is connected to the shock absorbers 108 via the solenoid valves 126–132 and the air lines 137. The front shock absorbers 108 are controlled via the front fill solenoid valve 132 and the front gate solenoid valve 126. When the front fill solenoid valve 132 and the front gate solenoid valve 126 are energized to an open position, air passage to the front shock absorbers 108 can be modified. The rear shock absorbers 108 are controlled via the rear fill solenoid valve 130 and the rear gate solenoid valve 128. When the rear fill solenoid valve 130 and the rear gate solenoid valve 128 are energized to an open position, air pressure to the rear shock absorbers 108 can be modified. With the shock absorbers 108 pressurized the front and rear fill valves 132, 130 are switched to a closed position. Under normal operation, the front gate solenoid valve 126 and rear gate solenoid valve 128 remain energized, allowing air to pass between air springs on one side to the other side. This allows the suspension to exhibit a first effective spring rate, which reduces ride harshness when, for instance, one side of the vehicle encounters a bump in the road. Upon attaining a predetermined lateral acceleration, the front and rear gate solenoid valves 126, 128 may be switched to a closed position to prevent the side to side transfer of air within shock absorbers 108. Under this condition, the second effective spring rate, which is higher than that of the first effective spring rate, provides additional tilt stabilization.

The automatic ride control system is also under the control of a vehicle ignition switch 142 and a suspension control switch 144 which must be turned to the off position when the vehicle 100 is to be hoisted, jacked, towed, jump-started or raised off the ground.

The controller in the present invention uses either an accelerometer or the sensed speed of the vehicle and the steering wheel position to determine the lateral acceleration of the vehicle to determine whether to make suspension adjustments or not. The suspension adjustments performed by the controller include switching the shock absorbers 108 from soft to firm and back, and closing the gate solenoid valves 126, 128 and reopening the gate solenoid valves 126, 128. Switching the shock absorbers 108 from soft to improves the suspensions ability to resist tilting of the vehicle body. Firmer damping by the shock absorbers 108 reduces relative movement between the body 102 and the wheels 104 of the vehicle 100.

Figure 2:
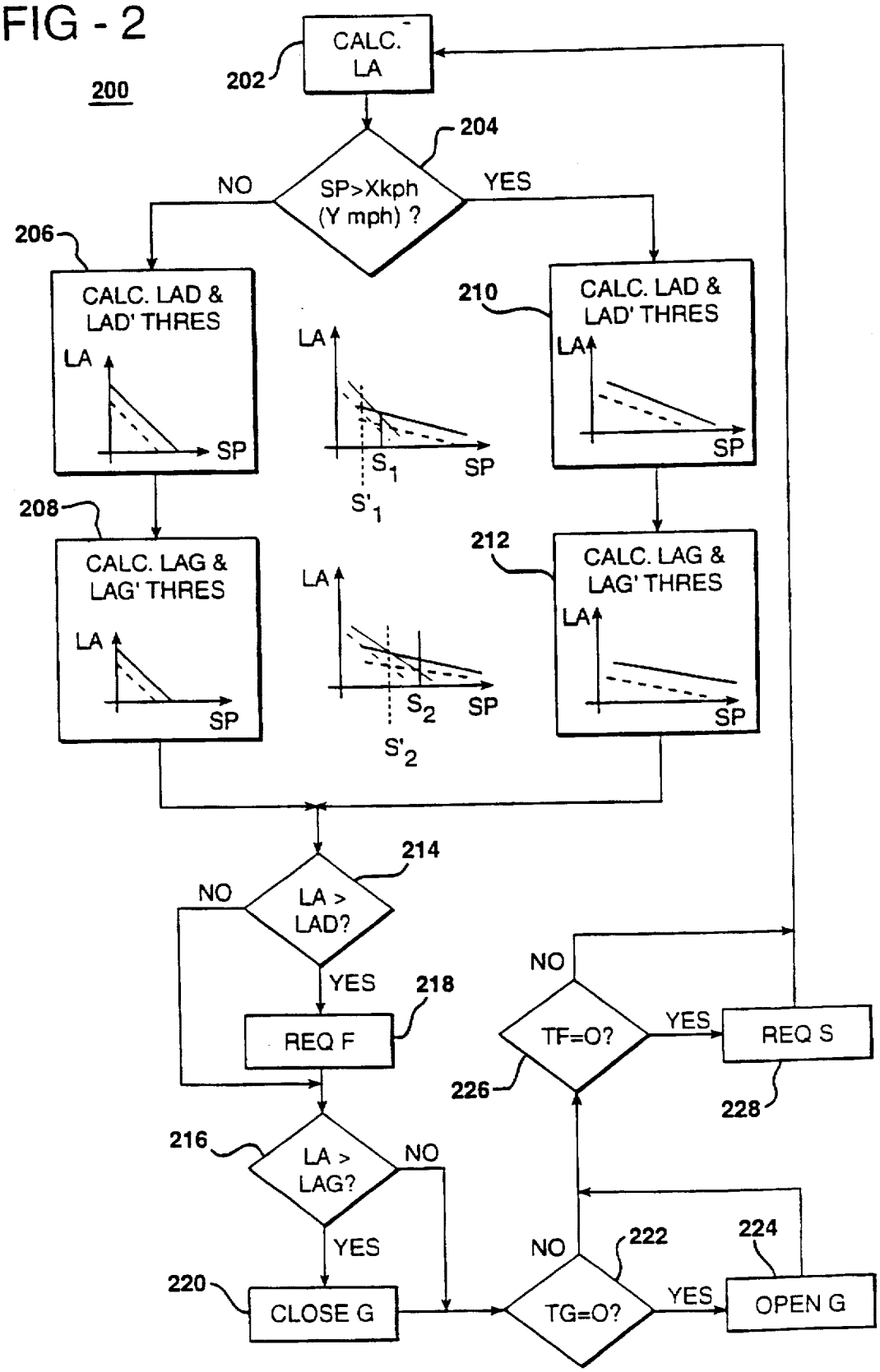
FIG. 2 is a flow chart showing illustrative steps for performing one embodiment of the invention of the present application.

A speed dependent suspension control will now be described with reference to FIG. 2 which is a flow chart 200 showing illustrative steps for operation of the invention. The initial step in the illustrative procedure of FIG. 2 is to calculate the lateral acceleration of the vehicle, see block 202. Lateral acceleration is calculated using the following equation:

$$LA = ((0.6818^2 \cdot V^2 \cdot F)/GR)/((57.3 \cdot L \cdot g) + (K \cdot 0.6818^2 \cdot V^2))$$

where:
F is the steering wheel angle in degrees;
GR is the steering gear ratio;
L is the wheel base in feet;
V is the vehicle velocity in miles per hour;
g is the acceleration of gravity; and
K is the understeer gradient.

After calculating the lateral acceleration (LA), the speed is determined as being less than or equal to a predetermined speed, for example 40 miles per hour (64.5 kilometers per hour), or greater than the predetermined speed, see block 204. Speed dependent thresholds are then determined by utilizing equations, linear equations as illustrated. A single predetermined speed is illustrated in FIG. 2 which, in effect, divides operation of the vehicle 100 into a low speed range and a high speed range. It is noted that two or more predetermined speeds could be used to increase the ranges of operation of the vehicle 100, i.e. three ranges for two predetermined speeds, four ranges for three predetermined speeds, etc.

As illustrated, if the speed is less than or equal to the predetermined speed, a first linear damping equation, $Y = M_1 x + B_1$, is used to calculate a lateral acceleration damping (LAD) threshold; and, a first linear gating equation, $Y = M_2 x + B_2$, is used to calculate a lateral acceleration gating (LAG) threshold, see blocks 206, 208.

If the speed is greater than the predetermined speed, a second linear damping equation, $Y = M_3 x + B_3$, is used to calculate the lateral acceleration damping (LAD) threshold; and, a second linear gating equation, $Y = M_4 x + B_4$, is used to calculate the lateral acceleration gating (LAG) threshold, see blocks 210, 212.

As can be seen between the blocks 206 and 210, if the first and second linear damping equations are combined they result in a piecewise linear graph with a break point at the intersection of the first and second linear damping equations, i.e. at the predetermined speed $S_1$. A similar result occurs for the combination of the first and second linear gating equations as can be seen between the blocks 208, 212. Here the predetermined speed $S_2$ selected for control of the gate solenoid valves 126, 128 is different than the predetermined speed $S_1$ for damping rate control. Examples of the constants for these threshold calculating equations for one working embodiment are as follows:

$M_1 = 0.0250$ and $B_1 = 0.24$;

$M_2 = 0.0250$ and $B_2 = 0.316$;

$M_3=0.0095$ and $B_3=0.335$; and
$M_4=0.0110$ and $B_4=0.413$.

After the lateral acceleration damping (LAD) threshold and lateral acceleration gating (LAG) threshold have been determined, the lateral acceleration (LA) is compared to these thresholds to determine whether suspension control action is needed, see blocks 214, 216. If the LA is greater than LAD, a request for a firmer damping factor for the shock absorbers 108 is generated, see the block 218. If the LA is greater than the LAG, the gate solenoid valves 126, 128 are closed, see the block 220.

In the currently preferred embodiment of the invention, once the gate solenoid valves 126, 128 are closed, they remain closed for a given period of time. Each time a request for closure of the gate solenoid valves 126, 128 is made, either via the block 220 or by some other component of the overall suspension system of the vehicle 100, a gate valve counter in the computer controller 106 is set to one of possibly a number of values to be down-counted by the computer controller 106 in the period of time corresponding to the setting of the gate valve counter, typically 1 to 5 seconds or so.

As long as conditions are such that a request for closure of the gate solenoid valves 126, 128 is in effect, either via the block 220 or by some other component of the overall suspension system of the vehicle 100, the gate valve counter in the computer controller 106 is stopped. As soon as the conditions change such that a request for closure of the gate solenoid valves 126, 128 is no longer in effect, the gate valve counter is down-counted by the computer controller 106 such that the gate valve counter reaches 0 upon expiration of the period of time corresponding to the setting of the gate valve counter.

Thus, after a request for closure of the gate valves 126, 128 is encountered, the gate solenoid valves 126, 128 are closed, the gate valve counter is set to a given value and, once the conditions leading to the request are no longer in effect, the gate valve counter is down-counted until the gate valve counter is equal to zero as checked in the block 222. If the gate valve counter is equal to zero, the gate solenoid valves 126, 128 are opened, see the block 224. As should be apparent, if multiple requests are made for closure of the gate solenoid valves 126, 128, the request with the maximum time will determine how long the gate solenoid valves are closed. Also, each new incoming closure request resets the gate valve counter.

In a similar manner, once the shock absorbers 108 are set to firm, it is currently preferred to reset or set them to soft after a period of time corresponding to the setting of a damping counter. Here again, setting the shock absorbers 108 to firm may be requested by one or more other components of the overall suspension system of the vehicle 100 and the ultimate time in the firm damping mode is determined by the specific requesting component. If a request is made, the shock absorbers 108 are set to firm, the damping counter set to a given value and, once the conditions leading to the request are no longer in effect, the damping counter is down-counted until the damping counter is equal to zero at which time a request to switch the shock absorbers 108 to soft is issued, see blocks 226, 228.

It is also possible to reopen the gate solenoid valves 126, 128 and to switch the shock absorbers 108 from firm to soft based on a gate valve open lateral acceleration gating (LAG') threshold and a switch back lateral acceleration damping (LAD') threshold. The calculations of these thresholds are performed the same as for the lateral acceleration damping (LAD) threshold and lateral acceleration gating (LAG) threshold as described above and is illustrated by the dashed lines in blocks 206–212 and the graphs between the blocks 206 and 210, and between the blocks 208 and 212.

Figure 3:
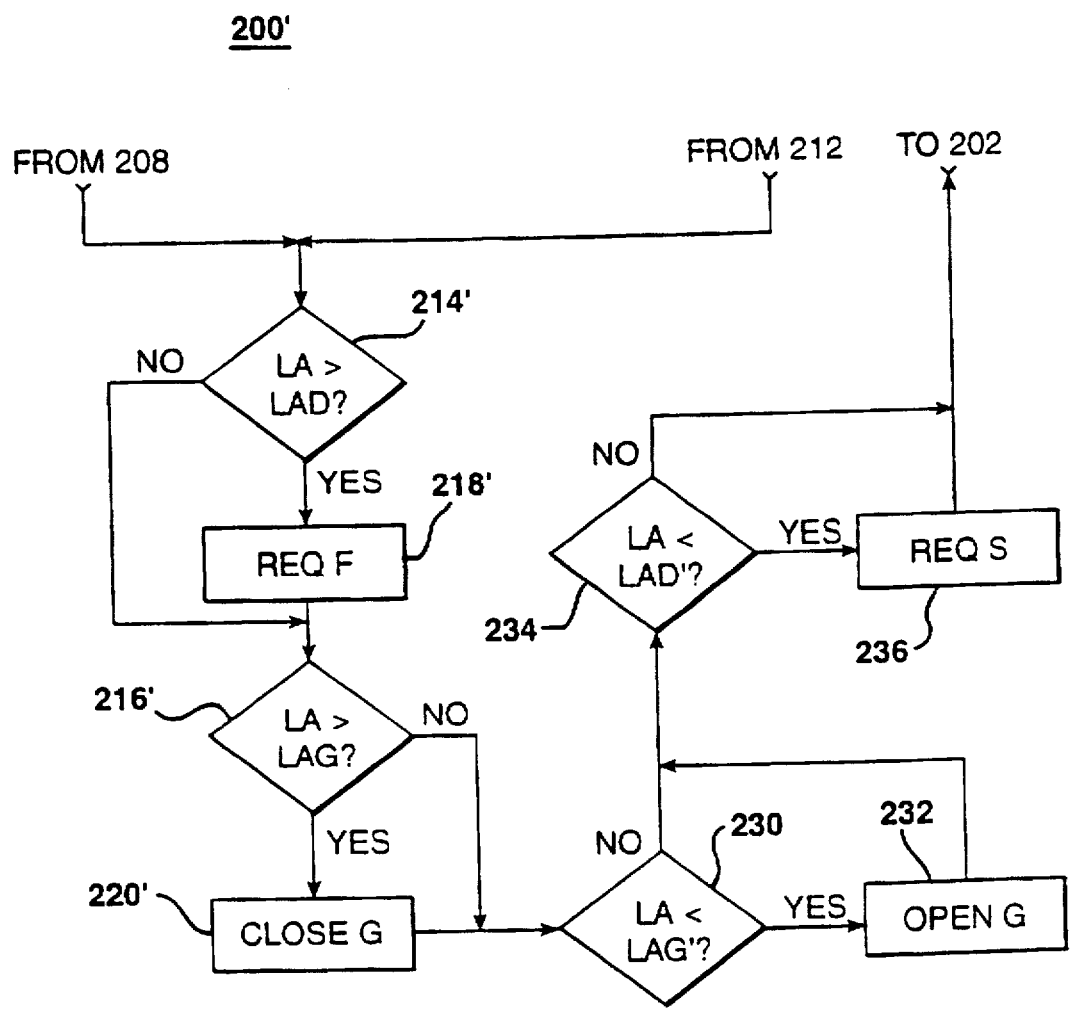
FIG. 3 is a flow chart showing illustrative steps for performing an alternative embodiment of the invention of the present application.

While operation using the gate valve open lateral acceleration gating (LAG') threshold and the switch back lateral acceleration damping (LAD') threshold should be apparent from the foregoing description, for sake of clarity, that operation will now be described with reference to FIG. 3. The flow chart of FIG. 3 includes altered steps for interconnecting blocks 208 and 212 to 202 of FIG. 2. Similar blocks are labeled with the same numerals which have been primed.

For operation with the gate valve open lateral acceleration gating (LAG') threshold and the switch back lateral acceleration damping (LAD') threshold, the calculated lateral acceleration is compared to the gate valve open lateral acceleration gating (LAG') threshold. The gate solenoid valves 126, 128 are opened if the calculated lateral acceleration is less than the gate valve open lateral acceleration gating (LAG') threshold, see blocks 220', 230, 232.

The calculated lateral acceleration is then compared to the switch back lateral acceleration damping (LAD') threshold, see block 234. A request to switch the shock absorbers 108 to soft is issued if the calculated lateral acceleration is less than the switch back lateral acceleration damping (LAD') threshold, see block 236.

Switching of the shock absorbers 108 from firm to soft and from soft to firm is preferably performed at substantially zero velocity of the shock absorbers to prevent vehicle body motions which may be sensed by the operator of the vehicle 100.

The foregoing description presents a single embodiment of the present invention. Details of construction have been shown and described for purposes of illustration rather than limitation. For example, it should be apparent that the system described could be applied to either the front axle or the rear axle alone, or to both as described in the preferred embodiment. Other modifications and alterations of the invention will no doubt occur to those skilled in the art that will come within the scope and spirit of the following claims.

What is claimed is:

1. A pneumatic tilt stabilization apparatus for use in a controllable suspension connected between a body and wheels of a motor vehicle, said pneumatic tilt stabilization apparatus comprising:

a lateral acceleration sensor for sensing lateral acceleration of said motor vehicle and generating a lateral acceleration signal corresponding thereto;

right and left air springs;

an air compressor for providing pressurized air to a main supply line;

a gate solenoid valve in fluid communication with said main supply line and said left and right air springs, said gate solenoid valve having a closed position for preventing fluid transfer between said right and left air springs and an open position for permitting fluid transfer between right and left air springs; and control means for selecting said open position of said gate solenoid valve when said lateral acceleration signal is below a predetermined minimum, thereby providing a first effective spring rate and selecting a closed position of said gate solenoid valve when said lateral acceleration signal exceeds a predetermined minimum, thereby providing a second effective spring rate, said second effective spring rate being higher than said first effective spring rate to provide increased tilt stabilization.

2. A pneumatic tilt stabilization apparatus according to claim 1, further comprises right and left front air springs;

right and left rear air springs;

a front gate solenoid valve in fluid communication with said main supply line and said right and left front air springs, said front gate solenoid valve having a closed position for preventing fluid transfer between said right and left front air springs and an open position for permitting fluid transfer between right and left front air springs; and a rear gate solenoid valve in fluid communication with said main supply line and said right and left rear air springs, said rear gate solenoid valve having a closed position for preventing fluid transfer between said right and left rear air springs and an open position for permitting fluid transfer between right and left rear air springs.

3. A pneumatic tilt stabilization apparatus according to claim 2, further comprises a front fill solenoid valve in fluid communication with said main supply line between said air compressor and said front gate solenoid valve; and a rear fill solenoid valve in fluid communication with said main supply line between said air compressor and said rear gate solenoid valve, whereby said control means selectively opens and closes said front and rear fill solenoid valves to independently adjust said front and rear air springs.

4. A pneumatic tilt stabilization apparatus according to claim 1, further comprises a vent solenoid valve in fluid communication with said main supply line between said air compressor and said gate solenoid valve, whereby said control means selectively opens and closes said vent solenoid valve to release air from said main supply line.

5. A pneumatic tilt stabilization apparatus for use in a controllable suspension connected between a body and wheels of a motor vehicle, said pneumatic tilt stabilization apparatus comprising:

a speed sensor for sensing vehicle speed and generating a speed signal therefrom;

a steering angle sensor for sensing an angular position of a steering wheel of said motor vehicle and generating a steering position signal therefrom;

right and left air springs;

an air compressor for providing pressurized air to a main supply line;

a gate solenoid valve in fluid communication with said main supply line and said right and left air springs, said gate solenoid valve having a closed position for preventing fluid transfer between said right and left air springs and an open position for permitting fluid transfer between right and left air springs; and control means for selecting said open position of said gate solenoid valve when said steering position signal and said speed signal indicate a lateral acceleration below a predetermined minimum, thereby providing a first effective spring rate and selecting said closed position of said gate solenoid valve when said steering position signal and said speed signal indicate a lateral acceleration in excess of a predetermined minimum, thereby providing a second effective spring rate, said second effective spring rate being higher than said first effective spring rate to provide increased tilt stabilization.

6. A pneumatic tilt stabilization apparatus according to claim 5, further comprises a vent solenoid valve in fluid communication with said main supply line between said air compressor and said gate solenoid valve, whereby said control means selectively opens and closes said vent solenoid valve to release air from said main supply line.

7. A pneumatic tilt stabilization apparatus according to claim 5, further comprises right and left front air springs;

right and left rear air springs;

a front gate solenoid valve in fluid communication with said main supply line and said right and left front air springs, said front gate solenoid valve having a closed position for preventing fluid transfer between said right and left front air springs and an open position for permitting fluid transfer between right and left front air springs; and a rear gate solenoid valve in fluid communication with said main supply line and said right and left rear air springs, said rear gate solenoid valve having a closed position for preventing fluid transfer between said right and left rear air springs and an open position for permitting fluid transfer between right and left rear air springs.

8. A pneumatic tilt stabilization apparatus according to claim 7, further comprises a front fill solenoid valve in fluid communication with said main supply line between said air compressor and said front gate solenoid valve; and a rear fill solenoid valve in fluid communication with said main supply line between said air compressor and said rear gate solenoid valve, whereby said control means selectively opens and closes said front and rear fill solenoid valves to independently adjust said front and rear air springs.

9. A pneumatic tilt stabilization apparatus according to claim 8, further comprises a vent solenoid valve in fluid communication with said main supply line between said front fill solenoid valve and said rear fill solenoid valve, whereby said control means selectively opens and closes said vent solenoid valve to release air from said main supply line.

10. A pneumatic tilt stabilization apparatus for use in a controllable suspension connected between a body and wheels of a motor vehicle, said pneumatic tilt stabilization apparatus comprising:

a speed sensor for sensing vehicle speed and generating a speed signal therefrom;

a steering angle sensor for sensing an angular position of a steering wheel of said motor vehicle and generating a steering position signal therefrom;

right and left front air springs;

right and left rear air springs;

an air compressor for providing pressurized air to a main supply line;

a front fill solenoid valve in fluid communication with said main supply line;

a rear fill solenoid valve in fluid communication with said main supply line;

a vent solenoid valve in fluid communication with said main supply line;

a front gate solenoid valve in fluid communication with said front fill solenoid valve and said left and right front air springs, said front gate solenoid valve having a closed position for preventing fluid transfer between said right and left front air springs and an open position for permitting fluid transfer between right and left front air springs;

a rear gate solenoid valve in fluid communication with said rear fill solenoid valve and said left and right rear air springs, said rear gate solenoid valve having a closed position for preventing fluid transfer between said right and left rear air springs and an open position for permitting fluid transfer between right and left rear air springs; and control means for selecting said open position of said front and rear gate solenoid valves when said steering position signal and said speed signal indicate a lateral acceleration below a predetermined minimum, thereby providing a first effective spring rate and selecting a closed position of said front and rear gate solenoid valves when steering position signal and said speed signal indicate said lateral acceleration exceeds a predetermined minimum, thereby providing a second effective spring rate, said second effective spring rate being higher than said first effective spring rate to provide increased tilt stabilization.

11. A pneumatic tilt stabilization apparatus according to claim 10, wherein said front fill solenoid valve is disposed in said main supply line between said air compressor and said front gate solenoid valve and said rear fill solenoid valve is disposed in said main supply line between said air compressor and said rear gate solenoid valve, whereby said control means selectively opens and closes said front and rear fill solenoid valves to independently adjust said front and rear air springs.

12. A pneumatic tilt stabilization apparatus according to claim 10, wherein said vent solenoid valve is disposed in said main supply line between said front fill solenoid valve and said rear fill solenoid valve, whereby said control means selectively opens and closes said vent solenoid valve to release air from said main supply line.

* * * * *